US012688773B2

(12) United States Patent
Vijaya Kumar et al.

(10) Patent No.: US 12,688,773 B2
(45) Date of Patent: Jul. 21, 2026

(54) INITIATING TRAFFIC SIGNAL TIMING PLAN GENERATION

(71) Applicant: GM Global Technology Operations LLC, Detroit, MI (US)

(72) Inventors: Vivek Vijaya Kumar, Shelby Township, MI (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 18/541,327

(22) Filed: Dec. 15, 2023

(65) Prior Publication Data

US 2025/0201116 A1 Jun. 19, 2025

(51) Int. Cl.
*G08G 1/08* (2006.01)
*G08G 1/01* (2006.01)
*G08G 1/095* (2006.01)

(52) U.S. Cl.
CPC ............. *G08G 1/08* (2013.01); *G08G 1/0129* (2013.01); *G08G 1/0133* (2013.01); *G08G 1/095* (2013.01)

(58) Field of Classification Search
CPC ...... G08G 1/08; G08G 1/0129; G08G 1/0133; G08G 1/095; G08G 1/0112; G08G 1/0116; G08G 1/012; G08G 1/0145; G08G 1/081; G08G 1/083
See application file for complete search history.

(56) References Cited

U.S. PATENT DOCUMENTS

2015/0073689 A1* 3/2015 Hampapur ........... G08G 1/0145 701/118
2019/0122547 A1 4/2019 Gaither
2022/0327925 A1* 10/2022 Jackson ............... G08G 1/0175
2023/0013604 A1* 1/2023 Neill .................... G08G 1/0112

FOREIGN PATENT DOCUMENTS

DE 102020201878 A1 8/2021
EP 1628274 A1 2/2006
EP 3425608 A1 1/2019

OTHER PUBLICATIONS

United States Patent and Trademark Office. U.S. Appl. No. 18/308,996, filed Apr. 28, 2023.
Liu, H., et al. U.S. Appl. No. 18/308,996, filed Apr. 28, 2023.

* cited by examiner

*Primary Examiner* — Davetta W Goins
*Assistant Examiner* — Sharmin Akhter
(74) *Attorney, Agent, or Firm* — Vivacqua Crane, PLLC

(57) ABSTRACT

A method for generating a traffic signal timing plan may include determining a current traffic metric. The method further may include identifying a timing plan generation trigger. The method further may include determining at least one historic traffic metric. The method further may include generating the traffic signal timing plan based at least in part on at least one of: the current traffic metric, the timing plan generation trigger, and the at least one historic traffic metric. The method further may include adjusting an operation of one or more traffic signals based at least in part on the traffic signal timing plan.

14 Claims, 2 Drawing Sheets

INITIATING TRAFFIC SIGNAL TIMING PLAN GENERATION

INTRODUCTION

The present disclosure relates to systems and methods for traffic signal control, and more particularly, to systems and methods for generating a traffic signal timing plan.

To mitigate traffic congestion and increase roadway efficiency, roadway intersections may be equipped with traffic signals and traffic signal controllers to direct traffic. The traffic signal controller executes a program to control one or more traffic signals based on a traffic signal timing plan. Traffic signal controllers may utilize multiple traffic signal timing plans to accommodate various traffic condition situations. For example, traffic signal controllers may utilize a day traffic signal timing plan and a night traffic signal timing plan to accommodate for differing traffic volume outside of peak road usage times. In some examples, changing traffic conditions and/or events causing abnormal traffic behavior may require adjustment of the traffic signal timing plan to ensure optimal performance of the traffic signal controlled intersection. However, traffic conditions may change dynamically, requiring immediate action to restore optimal performance of the intersection. Furthermore, anticipation and adjustment for pre-planned events may be resource intensive.

Thus, while current systems and methods for traffic signal control achieve their intended purpose, there is a need for a new and improved system and method for generating a traffic signal timing plan.

SUMMARY

According to several aspects, a method for generating a traffic signal timing plan is provided. The method may include determining a current traffic metric. The method further may include identifying a timing plan generation trigger. The method further may include determining at least one historic traffic metric. The method further may include generating the traffic signal timing plan based at least in part on at least one of: the current traffic metric, the timing plan generation trigger, and the at least one historic traffic metric. The method further may include adjusting an operation of one or more traffic signals based at least in part on the traffic signal timing plan.

In another aspect of the present disclosure, determining the current traffic metric further may include receiving telemetry data from one or more of a plurality of vehicles. Determining the current traffic metric further may include determining the current traffic metric based at least in part on the telemetry data.

In another aspect of the present disclosure, identifying the timing plan generation trigger further may include identifying a reactive timing plan generation trigger. Identifying the timing plan generation trigger further may include identifying a proactive timing plan generation trigger.

In another aspect of the present disclosure, determining the at least one historic traffic metric further may include determining a plurality of long-term historic traffic metrics over a first time period. Determining the at least one historic traffic metric further may include determining a plurality of short-term historic traffic metrics over a second time period. The second time period is shorter than the first time period.

In another aspect of the present disclosure, identifying the proactive timing plan generation trigger further may include receiving a proactive timing plan generation trigger request. The proactive timing plan generation trigger request includes event data about an event. Identifying the proactive timing plan generation trigger further may include identifying the proactive timing plan generation trigger based on the event data.

In another aspect of the present disclosure, identifying the reactive timing plan generation trigger further may include determining a short-term traffic metric change based at least in part on the current traffic metric and one or more of the plurality of short-term historic traffic metrics. Identifying the reactive timing plan generation trigger further may include comparing the short-term traffic metric change to a predetermined short-term traffic metric change threshold. Identifying the reactive timing plan generation trigger further may include identifying the reactive timing plan generation trigger in response to determining that the short-term traffic metric change is greater than or equal to the predetermined short-term traffic metric change threshold.

In another aspect of the present disclosure, generating the traffic signal timing plan based at least in part on at least one of: the current traffic metric, the timing plan generation trigger, and the at least one historic traffic metric further may include generating a reactive traffic signal timing plan in response to identifying the reactive timing plan generation trigger. Generating the traffic signal timing plan based at least in part on at least one of: the current traffic metric, the timing plan generation trigger, and the at least one historic traffic metric further may include generating a proactive traffic signal timing plan in response to identifying the reactive timing plan generation trigger.

In another aspect of the present disclosure, generating the reactive traffic signal timing plan further may include determining a predicted traffic metric change based at least in part on the current traffic metric and the plurality of long-term historic traffic metrics. Generating the reactive traffic signal timing plan further may include generating the reactive traffic signal timing plan based at least in part on the predicted traffic metric change. The reactive traffic signal timing plan includes at least a reactive traffic signal timing plan validity.

In another aspect of the present disclosure, the method further includes determining a rate of short-term traffic metric change based at least in part on the current traffic metric and one or more of the plurality of short-term historic traffic metrics. The method further includes determining the reactive traffic signal timing plan validity based at least in part on the rate of short-term traffic metric change.

In another aspect of the present disclosure, generating the proactive traffic signal timing plan further may include determining a predicted traffic metric change based at least in part on the current traffic metric, the plurality of long-term historic traffic metrics, and event data. Generating the proactive traffic signal timing plan further may include generating the proactive traffic signal timing plan based at least in part on the predicted traffic metric change. The proactive traffic signal timing plan includes at least a proactive traffic signal timing plan validity. The proactive traffic signal timing plan validity is determined based at least in part on the event data.

According to several aspects, a system for generating a traffic signal timing plan is provided. The system may include a server communication system. The system further may include a server controller in electrical communication with the server communication system. The server controller is programmed to receive telemetry data from one or more of a plurality of vehicles using the server communication system. The server controller is further programmed to determine a current traffic metric based at least in part on the telemetry data. The server controller is further programmed to identify a timing plan generation trigger. The timing plan generation trigger includes at least one of: a reactive timing plan generation trigger and a proactive timing plan generation trigger. The server controller is further programmed to determine at least one historic traffic metric. The at least one historic traffic metric includes at least one of: a plurality of long-term historic traffic metrics determined over a first time period and a plurality of short-term historic traffic metrics determined over a second time period. The second time period is shorter than the first time period. The server controller is further programmed to generate a reactive traffic signal timing plan in response to identifying the reactive timing plan generation trigger. The reactive traffic signal timing plan is generated based at least in part on at least one of: the current traffic metric, the timing plan generation trigger, and the at least one historic traffic metric. The server controller is further programmed to generate a proactive traffic signal timing plan in response to identifying the proactive timing plan generation trigger. The proactive traffic signal timing plan is generated based at least in part on at least one of: the current traffic metric, the timing plan generation trigger, and the at least one historic traffic metric. The server controller is further programmed to adjust an operation of one or more traffic signals using the server communication system based at least in part on at least one of: the reactive traffic signal timing plan and the proactive traffic signal timing plan.

In another aspect of the present disclosure, to identify the timing plan generation trigger, the server controller is further programmed to identify the reactive timing plan generation trigger. The reactive timing plan generation trigger is identified based at least in part on at least one of: a traffic anomaly, a time of day, a periodic trigger, and a random trigger.

In another aspect of the present disclosure, to identify the timing plan generation trigger based at least in part on the traffic anomaly, the server controller is further programmed to determine a short-term traffic metric change based at least in part on the current traffic metric and one or more of the plurality of short-term historic traffic metrics. To identify the timing plan generation trigger based at least in part on the traffic anomaly, the server controller is further programmed to compare the short-term traffic metric change to a predetermined short-term traffic metric change threshold. To identify the timing plan generation trigger based at least in part on the traffic anomaly, the server controller is further programmed to identify the reactive timing plan generation trigger in response to determining that the short-term traffic metric change is greater than or equal to the predetermined short-term traffic metric change threshold.

In another aspect of the present disclosure, to generate the reactive traffic signal timing plan, the server controller is further programmed to determine a predicted traffic metric change based at least in part on the current traffic metric and the plurality of long-term historic traffic metrics. To generate the reactive traffic signal timing plan, the server controller is further programmed to generate the reactive traffic signal timing plan based at least in part on the predicted traffic metric change. The reactive traffic signal timing plan includes at least a reactive traffic signal timing plan validity.

In another aspect of the present disclosure, to identify the timing plan generation trigger, the server controller is further programmed to receive a proactive timing plan generation trigger request. The proactive timing plan generation trigger request includes event data about an event. The event is at least one of: a road management event, a weather event, and a public event. To identify the timing plan generation trigger, the server controller is further programmed to identify the proactive timing plan generation trigger based on the event data.

In another aspect of the present disclosure, to generate the proactive traffic signal timing plan, the server controller is further programmed to determine a predicted traffic metric change based at least in part on the current traffic metric, the plurality of long-term historic traffic metrics, and event data. To generate the proactive traffic signal timing plan, the server controller is further programmed to generate the proactive traffic signal timing plan based at least in part on the predicted traffic metric change. The proactive traffic signal timing plan includes at least a proactive traffic signal timing plan validity. The proactive traffic signal timing plan validity is determined based at least in part on the event data.

In another aspect of the present disclosure, the server controller is further programmed to determine an event start time based at least in part on the event data. The server controller is further programmed to determine an event end time based at least in part on the event data. The server controller is further programmed to determine the proactive traffic signal timing plan validity based at least in part on the event start time and the event end time.

According to several aspects, a system for generating a traffic signal timing plan is provided. The system may include a traffic signal control system. The system further may include a server communication system. The system further may include a server controller in electrical communication with the traffic signal control system and the server communication system. The server controller is programmed to receive telemetry data from one or more of a plurality of vehicles using the server communication system. The server controller is further programmed to determine a current traffic metric based at least in part on the telemetry data. The server controller is further programmed to identify a timing plan generation trigger. The server controller is further programmed to determine at least one historic traffic metric. The server controller is further programmed to generate at least one of: a reactive traffic signal timing plan and a proactive traffic signal timing plan based at least in part on at least one of: the current traffic metric, the timing plan generation trigger, and the at least one historic traffic metric in response to identifying the timing plan generation trigger. The server controller is further programmed to adjust an operation of one or more traffic signals using the traffic signal control system based at least in part on at least one of: the reactive traffic signal timing plan and the proactive traffic signal timing plan.

In another aspect of the present disclosure, to identify the timing plan generation trigger, the server controller is further programmed to identify a reactive timing plan generation trigger. The reactive timing plan generation trigger is identified based at least in part on at least one of: a traffic anomaly, a time of day, a periodic trigger, and a random trigger. To identify the timing plan generation trigger, the server controller is further programmed to receive a proactive timing plan generation trigger request. The proactive timing plan generation trigger request includes event data about an event. The event is at least one of: a road management event, a weather event, and a public event. To identify the timing plan generation trigger, the server controller is further programmed to identify a proactive timing plan generation trigger based on the event data.

In another aspect of the present disclosure, to generate at least one of: the reactive traffic signal timing plan and the proactive traffic signal timing plan, the server controller is further programmed to determine a first predicted traffic metric change based at least in part on the current traffic metric and the at least one historic traffic metric. To generate at least one of: the reactive traffic signal timing plan and the proactive traffic signal timing plan, the server controller is further programmed to generate the reactive traffic signal timing plan based at least in part on the first predicted traffic metric change. The reactive traffic signal timing plan includes at least a reactive traffic signal timing plan validity. To generate at least one of: the reactive traffic signal timing plan and the proactive traffic signal timing plan, the server controller is further programmed to determine a second predicted traffic metric change based at least in part on the current traffic metric, the at least one historic traffic metric, and event data. To generate at least one of: the reactive traffic signal timing plan and the proactive traffic signal timing plan, the server controller is further programmed to generate the proactive traffic signal timing plan based at least in part on the second predicted traffic metric change. The proactive traffic signal timing plan includes at least a proactive traffic signal timing plan validity. The proactive traffic signal timing plan validity is determined based at least in part on the event data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, traffic conditions at a traffic signal controlled intersection may vary based on various factors. Therefore, traffic signal control systems may utilize multiple traffic signal timing plans to accommodate various traffic condition situations. For example, traffic signal control systems may utilize a day traffic signal timing plan and a night traffic signal timing plan to accommodate for differing traffic volume outside of peak road usage times. However, in aspects of the present disclosure, traffic conditions may vary rapidly due to traffic anomalies (e.g., motor vehicle accidents). Furthermore, traffic conditions may be affected by pre-planned events (e.g., road construction). Therefore, the present disclosure provides a new and improved system and method for generating a traffic signal timing plan capable of reactive adjustments due to changing traffic conditions and proactive adjustments due to future pre-planned events.

Figure 1:
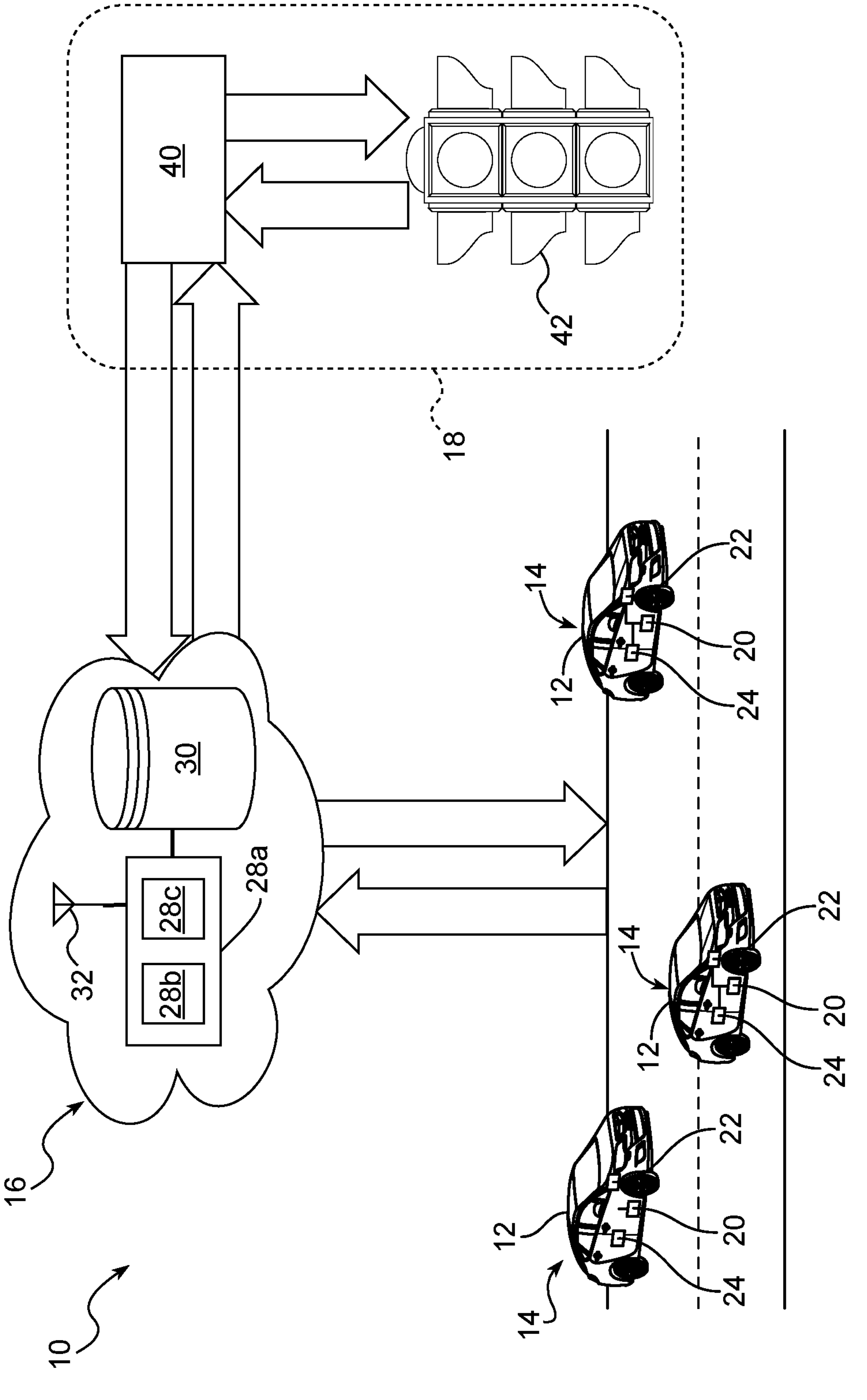
FIG. 1 is a schematic diagram of a system for generating a traffic signal timing plan, according to an exemplary embodiment.

Referring to FIG. 1, a schematic diagram of a system 10 for generating a traffic signal timing plan is shown. The system 10 includes a plurality of vehicles 12, each of the plurality of vehicles 12 including a vehicle system 14. The system 10 further includes a server system 16 and a traffic signal control system 18.

The vehicle system 14 includes a vehicle controller 20, a plurality of vehicle sensors 22, and a vehicle communication system 24.

The vehicle controller 20 is used in conjunction with the server system 16 to implement a method 100 for generating a traffic signal timing plan, as will be described below. The vehicle controller 20 includes at least one processor and a non-transitory computer readable storage device or media. The processor may be a custom made or commercially available processor, a central processing unit (CPU), a graphics processing unit (GPU), an auxiliary processor among several processors associated with the vehicle controller 20, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 20 to control various systems of the vehicle 12. The vehicle controller 20 may also consist of multiple controllers which are in electrical communication with each other. The vehicle controller 20 may be interconnected with additional systems and/or controllers of the vehicle 12, allowing the vehicle controller 20 to access data such as, for example, speed, acceleration, braking, and steering angle of the vehicle 12.

The vehicle controller 20 is in electrical communication with the plurality of vehicle sensors 22 and the vehicle communication system 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 20 are within the scope of the present disclosure.

The plurality of vehicle sensors 22 are used to acquire telemetry data of the vehicle 12. In the scope of the present disclosure, telemetry data includes, for example, engine RPM, vehicle speed, fuel level, engine temperature, odometer reading, battery voltage, brake system status, transmission data, tire pressure, GNSS location, acceleration and deceleration, steering angle, suspension system data, exhaust emission levels, diagnostic trouble codes (DTCs), airbag status, windshield wiper status, lights and indicators, and cruise control status. In exemplary embodiment, the plurality of vehicle sensors 22 includes sensors to determine performance data about the vehicle 12. In a non-limiting example, the plurality of vehicle sensors 22 further includes at least one of: a motor speed sensor, a motor torque sensor, an electric drive motor voltage and/or current sensor, an accelerator pedal position sensor, a brake position sensor, a coolant temperature sensor, a cooling fan speed sensor, a wheel speed sensor, and a transmission oil temperature sensor.

In another exemplary embodiment, the plurality of vehicle sensors 22 further includes sensors to determine information about an environment within the vehicle 12. In a non-limiting example, the plurality of vehicle sensors 22 further includes at least one of a seat occupancy sensor, a cabin air temperature sensor, a cabin motion detection sensor, a cabin camera, a cabin microphone, and/or the like.

In another exemplary embodiment, the plurality of vehicle sensors 22 further includes sensors to determine information about an environment surrounding the vehicle 12. In a non-limiting example, the plurality of vehicle sensors 22 further includes at least one of an ambient air temperature sensor, a barometric pressure sensor, a global navigation satellite system (GNSS), and/or a photo and/or video camera which is positioned to view the environment in front of the vehicle 12.

The GNSS is used to determine a geographical location of the vehicle 12. In an exemplary embodiment, the GNSS is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS may be integrated with the vehicle controller 20 (e.g., on a same circuit board with the vehicle controller 20 or otherwise a part of the vehicle controller 20) without departing from the scope of the present disclosure.

In another exemplary embodiment, at least one of the plurality of vehicle sensors 22 is a perception sensor capable of perceiving objects and/or measuring distances in the environment surrounding the vehicle 12. In a non-limiting example, the plurality of vehicle sensors 22 includes a stereoscopic camera having distance measurement capabilities. In one example, at least one of the plurality of vehicle sensors 22 is affixed inside of the vehicle 12, for example, in a headliner of the vehicle 12, having a view through a windscreen of the vehicle 12. In another example, at least one of the plurality of vehicle sensors 22 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, and/or time-of-flight sensors are within the scope of the present disclosure. The plurality of vehicle sensors 22 are in electrical communication with the vehicle controller 20 as discussed above.

The vehicle communication system 24 is used by the vehicle controller 20 to communicate with other systems external to the vehicle 12. For example, the vehicle communication system 24 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 24 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 24 may further include an embedded universal integrated circuit card (eUICC) configured to store at least one cellular connectivity configuration profile, for example, an embedded subscriber identity module (eSIM) profile. The vehicle communication system 24 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 24 may include one or more antennas and/or communication transceivers for receiving and/or transmitting signals, such as cooperative sensing messages (CSMs). The vehicle communication system 24 is configured to wirelessly communicate information between the vehicle 12 and another vehicle. Further, the vehicle communication system 24 is configured to wirelessly communicate information between the vehicle 12 and infrastructure or other vehicles. It should be understood that the vehicle communication system 24 may be integrated with the vehicle controller 20 (e.g., on a same circuit board with the vehicle controller 20 or otherwise a part of the vehicle controller 20) without departing from the scope of the present disclosure.

With continued reference to FIG. 1, the server system 16 includes a server controller 28*a* in electrical communication with a database 30 and a server communication system 32. In a non-limiting example, the server system 16 is located in a server farm, datacenter, or the like, and connected to the internet using the server communication system 32. The server controller 28*a* includes at least server processor 28*b* and a server non-transitory computer readable storage device or server media 28*c*. The description of the type and configuration given above for the vehicle controller 20 also applies to the server controller 28*a*. In some examples, the server controller 28*a* may differ from the vehicle controller 20 in that the server controller 28*a* is capable of a higher processing speed, includes more memory, includes more inputs/outputs, and/or the like. In a non-limiting example, the server processor 28*b* and server media 28*c* of the server controller 28*a* are similar in structure and/or function to the processor and the media of the vehicle controller 20, as described above. The server controller 28*a* is used in conjunction with the vehicle controller 20 to implement the method 100 for generating a traffic signal timing plan, as will be discussed in greater detail below. The database 30 is used to store telemetry data received from the plurality of vehicles 12, as will be discussed in greater detail below. The server communication system 32 is used to communicate with external systems, such as, for example, the vehicle controller 20 via the vehicle communication system 24. In a non-limiting example, server communication system 32 is similar in structure and/or function to the vehicle communication system 24 of the vehicle system 14, as described above. In some examples, the server communication system 32 may differ from the vehicle communication system 24 in that the server communication system 32 is capable of higher power signal transmission, more sensitive signal reception, higher bandwidth transmission, additional transmission/reception protocols, and/or the like.

With continued reference to FIG. 1, the traffic signal control system 18 includes a traffic signal controller 40 and a traffic signal 42. The traffic signal controller 40 is used to manage the operation of the traffic signal 42 at an intersection, controlling the flow of vehicular and/or pedestrian traffic. In an exemplary embodiment, the traffic signal controller 40 includes a microprocessor, memory, and input/output interfaces. In a non-limiting example, the microprocessor executes a control algorithm which activates signal lamps of the traffic signal 42 based on a traffic signal timing plan stored in the memory of the traffic signal controller 40. In an exemplary embodiment, the memory of the traffic signal controller 40 may store multiple traffic signal timing plans active at different times (e.g., at different times of day).

In the scope of the present disclosure, the traffic signal timing plan includes a plurality of phases. Each of the plurality of phases has a phase time and a phase signal which is illuminated by the traffic signal 42 during the phase. The phase signal may include, for example, a color (e.g., red, green, yellow, etc.) or other symbol (e.g., an arrow) illuminated by the traffic signal 42. The phase time denotes the length of the phase and may be adjusted to alter a traffic flow at the intersection controlled by the traffic signal 42. An order or sequence of the plurality of phases may also be adjusted to alter the traffic flow at the intersection. Furthermore, the traffic signal timing plan includes a traffic signal timing plan validity. In the scope of the present disclosure, the traffic signal timing plan validity denotes one or more time periods for which the traffic signal timing plan is valid and should be utilized. In a non-limiting example, the traffic signal timing plan validity includes a start time and an end time. In another non-limiting example, the traffic signal timing plan validity includes a duration. In another non-limiting example, the traffic signal timing plan validity includes a time schedule (e.g., Monday and Wednesday from 08:00 to 10:00).

In an exemplary embodiment, the input/output interfaces of the traffic signal controller 40 include a wireless and/or wired connection (e.g., internet connection) to an external system, allowing the traffic signal timing plan to be updated by the external system (e.g., the server system 16). Furthermore, the input/output interfaces include a wireless and/or wired connection to the traffic signal 42, such that the traffic signal controller 40 may control the traffic signal 42.

The traffic signal 42 is used to direct traffic at a traffic signal controlled intersection. In an exemplary embodiment, the traffic signal 42 includes one or more signal lamps which are separately electrically controllable by the traffic signal controller 40. In a non-limiting example, each of the one or more signal lamps is illuminated by a light source, such as, for example, an incandescent lamp, a light-emitting diode (LED), and/or the like. In a non-limiting example, the light source is capable of providing light having a particular color (i.e., wavelength), including, for example, green, red, and/or yellow. In a non-limiting example, at least one of the one or more signal lamps is configured to illuminate with a solid color. In another non-limiting example, at least one of the one or more signal lamps is configured to illuminate with a shape or symbol, such as, for example, an arrow. It should be understood that while the traffic signal 42 is discussed in the singular form for the sake of explanation, the entirety of the present disclosure is applicable to embodiments including multiple traffic signals 42, multiple traffic signal controlled intersections, and/or multiple traffic signal controllers 40.

The traffic signal controller 40 controls one or more traffic signals 42 at a traffic signal controlled intersection according to the traffic signal timing plan to avoid collisions and mitigate traffic buildup. However, changing environmental conditions, occurrence of traffic anomalies (e.g., vehicular accidents), occurrence of public events (e.g., concerts, parades, races, and/or the like), and/or the like may change characteristics of the traffic flow such that the traffic signal timing plan is no longer optimal. Therefore, the present disclosure provides a new and improved system and method for generating traffic signal timing plans while accounting for varying conditions.

Figure 2:
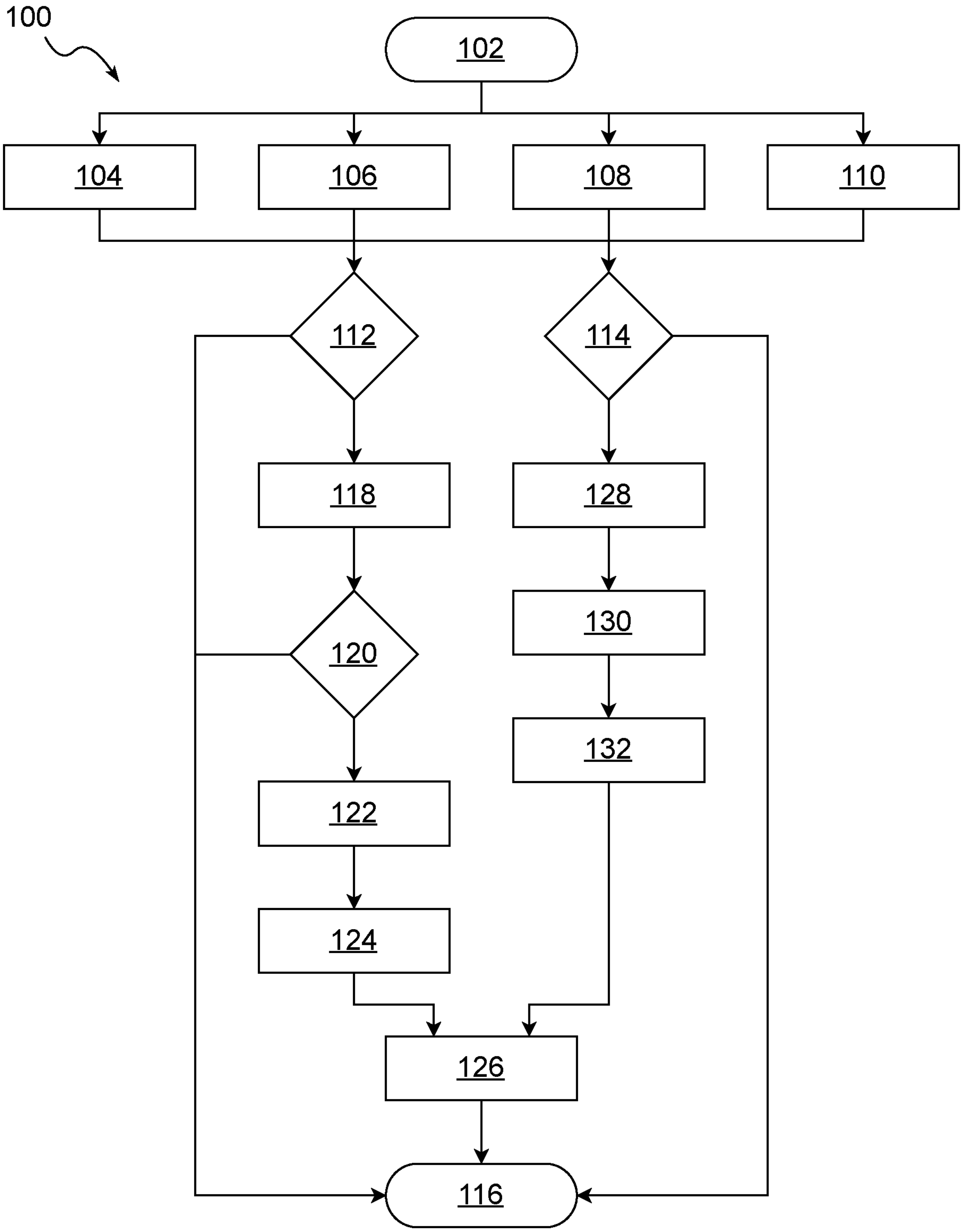
FIG. 2 is a flowchart of a method for generating a traffic signal timing plan, according to an exemplary embodiment.

Referring to FIG. 2, a flowchart of the method 100 for generating a traffic signal timing plan is shown. The method 100 begins at block 102 and proceeds to blocks 104, 106, 108, and 110. At block 104, the server system 16 determines a current traffic metric. In the scope of the present disclosure, the current traffic metric is related to a transit of one or more of the plurality of vehicles 12 through the intersection controlled by the traffic signal 42. In a non-limiting example, the traffic metric includes at least one of: an average speed while transiting the traffic signal controlled intersection, a control delay while transiting the traffic signal controlled intersection, and a quantity of stops while transiting the traffic signal controlled intersection.

In the scope of the present disclosure, the control delay is defined as a time from when a vehicle 12 begins decelerating from an initial vehicle speed to stop at the traffic signal controlled intersection (i.e., because the traffic signal 42 has turned red) to when the vehicle 12 returns to the initial vehicle speed after transiting the traffic signal controlled intersection (i.e., after the traffic signal 42 has turned green), including any time spent waiting at the intersection (e.g., waiting at a red light). In the scope of the present disclosure, the quantity of stops while transiting the traffic signal controlled intersection is defined as a number of times which the vehicle 12 comes to a complete stop before transiting the traffic signal controlled intersection.

In an exemplary embodiment, to determine the current traffic metric, the server system 16 uses the server communication system 32 to receive telemetry data from one or more of the plurality of vehicles 12. The server controller 28*a* subsequently determines the current traffic metric based at least in part on the telemetry data. In the scope of the present disclosure, telemetry data includes, for example, engine RPM, vehicle speed, fuel level, engine temperature, odometer reading, battery voltage, brake system status, transmission data, tire pressure, GNSS location, acceleration and deceleration, steering angle, suspension system data, exhaust emission levels, diagnostic trouble codes (DTCs), airbag status, windshield wiper status, lights and indicators, and cruise control status.

In an exemplary embodiment, the server controller 28*a* determines the current traffic metric based at least in part on the telemetry data. In a non-limiting example, the server controller 28*a* uses signal and/or data processing techniques to analyze the telemetry data and determine the current traffic metric. In a non-limiting example, the server controller 28*a* analyzes the velocity and geographical location of the vehicle 12 relative to a geographical location of the traffic signal controlled intersection to determine the current traffic metric. In another non-limiting example, the server controller 28*a* uses a machine learning model trained to recognize patterns in the telemetry data associated with the current traffic metric (e.g., control delay and/or quantity of stops). After determination of the current traffic metric, the current traffic is saved in the server media 28*c* for later retrieval. It should be understood that the server controller 28*a* may determine one or more current traffic metrics, and that the entirety of the present disclosure is equally applicable to embodiments including a plurality of current traffic metrics. After block 104, the method 100 proceeds to blocks 112 and 114, as will be discussed in greater detail below.

At block 106, the server system 16 determines at least one historic traffic metric. In an exemplary embodiment, the at least one historic traffic metric includes a plurality of long-term traffic metrics and a plurality of short-term traffic metrics. In the scope of the present disclosure, the plurality of long-term traffic metrics includes traffic metrics aggregated over a first time period. The plurality of short-term traffic metrics includes traffic metrics aggregated over a second time period. The second time period is shorter than the first time period. In a non-limiting example, the first time period includes, for example, one or more days, weeks, months, and/or years. The second time period includes, for example, one or more hours, minutes, and/or seconds. In an exemplary embodiment, the plurality of long-term traffic metrics may be used to determine long-term traffic metric trends (e.g., control delay is higher on Monday mornings than on other days of the week). The plurality short-term traffic metrics may be used to determine short-term traffic metric trends (e.g., control delay is increasing linearly over the past hour).

In an exemplary embodiment, the plurality of long-term traffic metrics and the plurality of short-term traffic metrics are determined using mathematical (e.g., statistical) analysis of a plurality of traffic metrics stored in the server media 28*c*. After block 106, the method 100 proceeds to blocks 112 and 114, as will be discussed in greater detail below.

At block 108, the server system 16 receives event data about an event. In the scope of the present disclosure, the event includes, for example, at least one of: a road management event (e.g., a road closure, road construction, road maintenance, debris on the roadway, and/or the like), a weather event (e.g., precipitation, high/low temperatures, severe weather, and/or the like), and a public event (e.g., a parade, a race, a festival, a market, and/or the like). In an exemplary embodiment, the event data includes, for example, an event start time, an event end time, an event duration, an event size, an event location, and/or the like. In an exemplary embodiment, the event data is retrieved and/or received from an external system and/or network (e.g., the internet) using the server communication system 32. After block 108, the method 100 proceeds to blocks 112 and 114, as will be discussed in greater detail below.

At block 110, the server system 16 receives additional relevant information about the environment surrounding the traffic signal 42. In a non-limiting example, the additional relevant information includes, for example, traffic anomaly information (e.g., information about motor vehicle accidents, information about traffic signal preemption for emergency vehicles or freight mobility, and/or the like), time information (e.g., a current time of day), date information (e.g., a current date), location information (e.g., a geographical location of the traffic signal 42), and/or the like. In an exemplary embodiment, the additional relevant information is retrieved and/or received from an external system and/or network (e.g., the internet) using the server communication system 32. In another exemplary embodiment, the additional relevant information is retrieved from the server media 28*c*. In another exemplary embodiment, the additional relevant information is retrieved from another module of the server controller 28*a* (e.g., a real-time clock module). After block 110, the method 100 proceeds to blocks 112 and 114, as will be discussed in greater detail below.

At block 112, the server system 16 identifies a proactive timing plan generation trigger. In the scope of the present disclosure, the proactive timing plan generation trigger is used to trigger generation of a proactive traffic signal timing plan based on known and/or predicted information about future changes in traffic characteristics. In an exemplary embodiment, the server controller 28*a* receives a proactive timing plan generation trigger request using the server communication system 32. In a non-limiting example, the proactive timing plan generation trigger request includes event data about the event, as discussed above in reference to block 108. For example, a government agency may send a proactive timing plan generation trigger request including event data about a road construction event.

In another exemplary embodiment, the server controller 28*a* automatically identifies the proactive timing plan generation trigger based on information received or determined at blocks 106, 108 and/or 110, as discussed above. For example, the server controller 28*a* may identify an upcoming severe weather event and identify the proactive timing plan generation trigger based on the upcoming severe weather event. In another example, the server controller 28*a* may identify an upcoming public event (e.g., a parade) and identify the proactive timing plan generation trigger based on the upcoming public event.

It should be understood that the proactive timing plan generation trigger may be identified based on a human and/or machine generated request sent from another external system (e.g., via the internet) and/or based on analysis of known historic traffic metrics, event data, and/or additional relevant information to determine predicted and/or planned upcoming events causing changes in traffic characteristics. If the proactive timing plan generation trigger is not identified, the method 100 proceeds to enter a standby state at block 116. If the proactive timing plan generation trigger is identified, the method 100 proceeds to block 118.

At block 118, the server system 16 determines a predicted traffic metric change based at least in part on the current traffic metric determined at block 104, the plurality of short-term and long-term historic traffic metrics determined at block 106, the event data determined at block 108, and the additional relevant information determined at block 110. In an exemplary embodiment, to predict the traffic metric change, the server system 16 utilizes a weighted average of current traffic metrics, short-term change in traffic metrics, long-term historic traffic metrics, and event data:

$$\Delta M = W_1 * M_{c,i} + W_2 * \Delta M_s + W_3 * M_l + W_4 * E \quad (1)$$

where ΔM is the predicted traffic metric change, $W_1$, $W_2$, $W_3$, and $W_4$ are predetermined weight values, $M_{c,i}$ is the current traffic metric, $\Delta M_s$ is a short-term traffic metric change as determined based on the current traffic metric and one or more of the plurality of short-term historic traffic metrics, $M_l$ is one or more of the plurality of long-term historic traffic metrics, and E is an event factor based at least in part on the event data. In a non-limiting example, the event factor is a function of at least one of: the event location, the event size, and/or the event duration. It should be understood that Equation 1 may further include the additional relevant information without departing from the scope of the present disclosure.

In a non-limiting example, the short-term traffic metric change is defined as:

$$\Delta M_s = M_{c,i} - M_{c,i-1} \quad (2)$$

where $M_{c,i-1}$ is one of the plurality of short-term historic traffic metrics.

In another exemplary embodiment, the server system 16 utilizes a machine learning algorithm which is trained to determine the predicted traffic metric change based at least in part on the current traffic metric determined at block 104, the plurality of short-term and long-term historic traffic metrics determined at block 106, the event data determined at block 108, and/or the additional relevant information determined at block 110. After block 118, the method 100 proceeds to block 120.

At block 120, the server system 16 compares the short-term traffic metric change to a predetermined predicted traffic metric change threshold. In a non-limiting example, the predetermined predicted traffic metric change threshold may be decreased by the event factor to increase sensitivity during events. If the short-term traffic metric change is less than or equal to the predetermined predicted traffic metric change threshold, the method 100 proceeds to enter the standby state at block 116. If the short-term traffic metric change is greater than the predetermined predicted traffic metric change threshold, the method 100 proceeds to block 122.

At block 122, the server system 16 generates the proactive traffic signal timing plan based at least in part on the predicted traffic metric change determined at block 118. In an exemplary embodiment, the proactive traffic signal timing plan is determined using a traffic signal timing optimization algorithm. In a non-limiting example, the traffic signal timing optimization algorithm functions by considering various factors, such as traffic volume, vehicle queues, traffic metrics, and pedestrian activity. The traffic signal timing optimization algorithm generates the proactive traffic signal timing plan. In another non-limiting example, the traffic signal timing optimization algorithm is implemented as discussed in U.S. application Ser. No. 18/308,996, titled "OPTIMIZING TRAFFIC SIGNAL TIMING USING VEHICLE TELEMETRY DATA", filed on Apr. 28, 2023, the entire contents of which is hereby incorporated by reference. After block 122, the method 100 proceeds to block 124.

At block 124, the server system 16 determines a proactive traffic signal timing plan validity. In the scope of the present disclosure, the proactive traffic signal timing plan validity denotes one or more time periods for which the traffic signal timing plan is valid and should be utilized, as discussed above. In an exemplary embodiment, the proactive traffic signal timing plan validity is determined based at least in part on the event data determined at block 108. In a non-limiting example, the start time of the proactive traffic signal timing plan validity is determined to be at or before the event start time. The end time of the proactive traffic signal timing plan validity is determined to be at or after the event end time. After block 124, the method 100 proceeds to block 126, as will be discussed in greater detail below.

At block 114, the server system 16 identifies a reactive timing plan generation trigger. In the scope of the present disclosure, the reactive timing plan generation trigger is used to trigger generation of a reactive traffic signal timing plan based on current information about real-time changes in traffic characteristics. For example, a traffic anomaly (e.g., a motor vehicle accident) may cause a sudden, drastic change in traffic characteristics. In an exemplary embodiment, to identify the reactive timing plan generation trigger, the server system 16 determines the short-term traffic metric change based at least in part on the current traffic metric and one or more of the plurality of short-term historic traffic metrics, as discussed above (see Equation 2). The short-term traffic metric change is compared to a predetermined short-term traffic metric change threshold. In a non-limiting example, a short-term traffic metric change greater than the predetermined short-term traffic metric change threshold may indicate the occurrence of a traffic anomaly. If the short-term traffic metric change is less than or equal to the predetermined short-term traffic metric change threshold, reactive timing plan generation trigger is not identified. If the short-term traffic metric change is greater than the predetermined short-term traffic metric change threshold, reactive timing plan generation trigger is identified.

In another exemplary embodiment, the reactive timing plan generation trigger is identified based on additional factors, such as, for example a time of day, a periodic trigger, and a random trigger. In the scope of the present disclosure, the periodic trigger means that the reactive timing plan generation trigger is automatically identified periodically (e.g., every two hours), regardless of traffic conditions. The random trigger means that the reactive timing plan generation trigger is identified randomly (e.g., with a ten percent chance every hour), regardless of traffic conditions.

In another exemplary embodiment, the server system 16 uses a machine learning algorithm trained to identify the reactive timing plan generation trigger based at least in part on the current traffic metric determined at block 104, the plurality of short-term and long-term historic traffic metrics determined at block 106, the event data determined at block 108, and/or the additional relevant information determined at block 110.

If the reactive timing plan generation trigger is not identified, the method 100 proceeds to enter a standby state at block 116. If the reactive timing plan generation trigger is identified, the method 100 proceeds to block 128.

At block 128, the server system 16 determines the predicted traffic metric change based at least in part on the current traffic metric determined at block 104, the plurality of short-term and long-term historic traffic metrics determined at block 106, and the additional relevant information determined at block 110. In an exemplary embodiment, to predict the traffic metric change, the server system 16 utilizes a weighted average of current traffic metrics, short-term change in traffic metrics, and long-term historic traffic metrics:

$$\Delta M = W_1 * M_{c,i} + W_2 * \Delta M_s + W_3 * M_l \quad (3)$$

wherein ΔM is the predicted traffic metric change, $W_1$, $W_2$, and $W_3$ are predetermined weight values, $M_{c,i}$ is the current traffic metric, $\Delta M_s$ is the short-term traffic metric change as determined based on the current traffic metric and one or more of the plurality of short-term historic traffic metrics, and $M_l$ is one or more of the plurality of long-term historic traffic metrics. It should be understood that the predetermined weight values used in Equation 3 may differ from the predetermined weight values used in Equation 1. It should further be understood that Equation 3 may further include the additional relevant information without departing from the scope of the present disclosure.

In another exemplary embodiment, the server system 16 utilizes a machine learning algorithm which is trained to determine the predicted traffic metric change based at least in part on the current traffic metric determined at block 104, the plurality of short-term and long-term historic traffic metrics determined at block 106, and/or the additional relevant information determined at block 110. After block 128, the method 100 proceeds to block 130.

At block 130, the server system 16 generates the reactive traffic signal timing plan based at least in part on the predicted traffic metric change determined at block 128. In an exemplary embodiment, the reactive traffic signal timing plan is determined using a traffic signal timing optimization algorithm. In a non-limiting example, the traffic signal timing optimization algorithm functions by considering various factors, such as traffic volume, vehicle queues, traffic metrics, and pedestrian activity. The traffic signal timing optimization algorithm generates the reactive traffic signal timing plan. In another non-limiting example, the traffic signal timing optimization algorithm is implemented as discussed in U.S. application Ser. No. 18/308,996, titled "OPTIMIZING TRAFFIC SIGNAL TIMING USING VEHICLE TELEMETRY DATA", filed on Apr. 28, 2023, the entire contents of which is hereby incorporated by reference. After block 130, the method 100 proceeds to block 132.

At block 132, the server system 16 determines a reactive traffic signal timing plan validity. In the scope of the present disclosure, the reactive traffic signal timing plan validity denotes one or more time periods for which the traffic signal timing plan is valid and should be utilized, as discussed above. In an exemplary embodiment, the reactive traffic signal timing plan validity is determined based at least in part on a rate of short-term traffic metric change. In a non-limiting example, the rate of short-term traffic metric change is defined as:

$$\frac{\Delta M_s}{\Delta t} = \frac{M_{c,i} - M_{c,i-1}}{t_i - t_{i-1}} \quad (4)$$

where $$\frac{\Delta M_s}{\Delta t}$$

is the rate of short-term traffic metric change, $t_i$ is a time of measurement of the current traffic metric $M_{c,i}$, and $t_{i-1}$ is a time of measurement of the one of the plurality of short-term historic traffic metrics $M_{c,i-1}$. In a non-limiting example, the reactive traffic signal timing plan validity is inversely proportional to the rate of short-term traffic metric change. In other words, as the rate of short-term traffic metric change increases, a duration of the reactive traffic signal timing plan validity decreases. It should be understood that any mathematical relationship between the rate of short-term traffic metric change and the reactive traffic signal timing plan validity is within the scope of the present disclosure.

In another exemplary embodiment, the reactive traffic signal timing plan validity is determined using a weighted average:

$$V_r \propto \left[ W_1 * \frac{\Delta M_s}{\Delta t} + W_2 * \frac{\Delta M_l}{\Delta t} \right] \quad (5)$$

where $V_r$ is the duration of the reactive traffic signal timing plan validity, $W_1$ and $W_2$ are predetermined weight values, and $$\frac{\Delta M_l}{\Delta t}$$

is a long-term traffic metric change determined based on the plurality of long-term historic traffic metrics (e.g., using a statistical analysis of the plurality of long-term historic traffic metrics). In a non-limiting example, the duration of the reactive traffic signal timing plan validity may be restricted between a predetermined minimum duration and a predetermined maximum duration. It should be understood that the predetermined weight values used in Equation 5 may differ from the predetermined weight values used in Equation 1 and Equation 3.

In another exemplary embodiment, the reactive traffic signal timing plan validity is determined using a machine learning algorithm trained to determine the reactive traffic signal timing plan validity based at least in part on the current traffic metric determined at block 104, the plurality of short-term and long-term historic traffic metrics determined at block 106, the event data determined at block 108, and/or the additional relevant information determined at block 110. After block 132, the method 100 proceeds to block 126, as will be discussed in greater detail below.

At block 126, the server system 16 adjusts an operation of the traffic signal 42 using the traffic signal control system 18, as discussed above. In an exemplary embodiment, the server system 16 uses the server communication system 32 to transmit the proactive traffic signal timing plan and the proactive traffic signal timing plan validity to the traffic signal controller 40. In another exemplary embodiment, the server system 16 uses the server communication system 32 to transmit the reactive traffic signal timing plan and the reactive traffic signal timing plan validity to the traffic signal controller 40. The traffic signal controller 40 subsequently controls the signal lamps of the traffic signal 42 by executing one of one or more traffic signal timing plans stored in the memory of the traffic signal controller 40 (e.g., the proactive traffic signal timing plan or the reactive traffic signal timing plan). In a non-limiting example, the one of the one or more traffic signal timing plans stored in the memory of the traffic signal controller 40 is selected based on the traffic signal timing plan validity (e.g., the proactive traffic signal timing plan validity or the reactive traffic signal timing plan validity) of each of one or more traffic signal timing plans stored in the memory of the traffic signal controller 40. After block 126, the method 100 proceeds to enter the standby state at block 116.

In an exemplary embodiment, the server controller 28*a* repeatedly exits the standby state 116 and restarts the method 100 at block 102. In a non-limiting example, the server controller 28*a* exits the standby state 116 and restarts the method 100 on a timer, for example, every three hundred milliseconds.

The system 10 and method 100 of the present disclosure offer several advantages. By dynamically identifying reactive timing plan generation triggers, the system 10 and method 100 may adjust the operation of the traffic signal in real-time based on changing traffic conditions. By identifying proactive timing plan generation triggers, the system 10 and method 100 may proactively identify future potential changes to traffic conditions and adjust the operation of the traffic signal to minimize disruption to traffic flow.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for generating a traffic signal timing plan, the method comprising:

determining a current traffic metric;

identifying a timing plan generation trigger, wherein identifying the timing plan generation trigger further comprises:

identifying a reactive timing plan generation trigger; and identifying a proactive timing plan generation trigger;

determining at least one historic traffic metric, wherein determining the at least one historic traffic metric further comprises:

determining a plurality of long-term historic traffic metrics over a first time period; and determining a plurality of short-term historic traffic metrics over a second time period, wherein the second time period is shorter than the first time period;

generating the traffic signal timing plan based at least in part on at least one of: the current traffic metric, the timing plan generation trigger, and the at least one historic traffic metric;

adjusting an operation of one or more traffic signals based at least in part on the traffic signal timing plan; and wherein identifying the reactive timing plan generation trigger further comprises:

determining a short-term traffic metric change based at least in part on the current traffic metric and one or more of the plurality of short-term historic traffic metrics;

comparing the short-term traffic metric change to a predetermined short-term traffic metric change threshold; and identifying the reactive timing plan generation trigger in response to determining that the short-term traffic metric change is greater than or equal to the predetermined short-term traffic metric change threshold.

2. The method of claim 1, wherein determining the current traffic metric further comprises:

receiving telemetry data from one or more of a plurality of vehicles; and determining the current traffic metric based at least in part on the telemetry data.

3. The method of claim 1, wherein identifying the proactive timing plan generation trigger further comprises:

receiving a proactive timing plan generation trigger request, wherein the proactive timing plan generation trigger request includes event data about an event; and identifying the proactive timing plan generation trigger based on the event data.

4. The method of claim 1, wherein generating the traffic signal timing plan based at least in part on at least one of: the current traffic metric, the timing plan generation trigger, and the at least one historic traffic metric further comprises:

generating a reactive traffic signal timing plan in response to identifying the reactive timing plan generation trigger; and generating a proactive traffic signal timing plan in response to identifying the proactive timing plan generation trigger.

5. The method of claim 4, wherein generating the reactive traffic signal timing plan further comprises:

determining a predicted traffic metric change based at least in part on the current traffic metric and the plurality of long-term historic traffic metrics; and generating the reactive traffic signal timing plan based at least in part on the predicted traffic metric change, wherein the reactive traffic signal timing plan includes at least a reactive traffic signal timing plan validity.

6. The method of claim 5, further comprising:

determining a rate of short-term traffic metric change based at least in part on the current traffic metric and one or more of the plurality of short-term historic traffic metrics; and determining the reactive traffic signal timing plan validity based at least in part on the rate of short-term traffic metric change.

7. The method of claim 4, wherein generating the proactive traffic signal timing plan further comprises:

determining a predicted traffic metric change based at least in part on the current traffic metric, the plurality of long-term historic traffic metrics, and event data; and generating the proactive traffic signal timing plan based at least in part on the predicted traffic metric change, wherein the proactive traffic signal timing plan includes at least a proactive traffic signal timing plan validity, and wherein the proactive traffic signal timing plan validity is determined based at least in part on the event data.

8. A system for generating a traffic signal timing plan, the system comprising:

a server communication system;

a server controller in electrical communication with the server communication system, wherein the server controller is programmed to:

receive telemetry data from one or more of a plurality of vehicles using the server communication system;

determine a current traffic metric based at least in part on the telemetry data;

identify a timing plan generation trigger, wherein the timing plan generation trigger includes at least one of: a reactive timing plan generation trigger and a proactive timing plan generation trigger, wherein to identify the timing plan generation trigger, the server controller is further programmed to:

identify the reactive timing plan generation trigger, wherein the reactive timing plan generation trigger is identified based at least in part on at least one of: a traffic anomaly, a time of day, a periodic trigger, and a random trigger;

determine at least one historic traffic metric, wherein the at least one historic traffic metric includes at least one of: a plurality of long-term historic traffic metrics determined over a first time period and a plurality of short-term historic traffic metrics determined over a second time period, wherein the second time period is shorter than the first time period;

generate a reactive traffic signal timing plan in response to identifying the reactive timing plan generation trigger, wherein the reactive traffic signal timing plan is generated based at least in part on at least one of: the current traffic metric, the timing plan generation trigger, and the at least one historic traffic metric;

generate a proactive traffic signal timing plan in response to identifying the proactive timing plan generation trigger, wherein the proactive traffic signal timing plan is generated based at least in part on at least one of: the current traffic metric, the timing plan generation trigger, and the at least one historic traffic metric;

adjust an operation of one or more traffic signals using the server communication system based at least in part on at least one of: the reactive traffic signal timing plan and the proactive traffic signal timing plan; and wherein to identify the timing plan generation trigger based at least in part on the traffic anomaly, the server controller is further programmed to:

determine a short-term traffic metric change based at least in part on the current traffic metric and one or more of the plurality of short-term historic traffic metrics;

compare the short-term traffic metric change to a predetermined short-term traffic metric change threshold; and identify the reactive timing plan generation trigger in response to determining that the short-term traffic metric change is greater than or equal to the predetermined short-term traffic metric change threshold.

9. The system of claim 8, wherein to generate the reactive traffic signal timing plan, the server controller is further programmed to:

determine a predicted traffic metric change based at least in part on the current traffic metric and the plurality of long-term historic traffic metrics; and generate the reactive traffic signal timing plan based at least in part on the predicted traffic metric change, wherein the reactive traffic signal timing plan includes at least a reactive traffic signal timing plan validity.

10. The system of claim 8, wherein to identify the timing plan generation trigger, the server controller is further programmed to:

receive a proactive timing plan generation trigger request, wherein the proactive timing plan generation trigger request includes event data about an event, and wherein the event is at least one of: a road management event, a weather event, and a public event; and identify the proactive timing plan generation trigger based on the event data.

11. The system of claim 10, wherein to generate the proactive traffic signal timing plan, the server controller is further programmed to:

determine a predicted traffic metric change based at least in part on the current traffic metric, the plurality of long-term historic traffic metrics, and event data; and generate the proactive traffic signal timing plan based at least in part on the predicted traffic metric change, wherein the proactive traffic signal timing plan includes at least a proactive traffic signal timing plan validity, and wherein the proactive traffic signal timing plan validity is determined based at least in part on the event data.

12. The system of claim 11, wherein the server controller is further programmed to:

determine an event start time based at least in part on the event data;

determine an event end time based at least in part on the event data; and determine the proactive traffic signal timing plan validity based at least in part on the event start time and the event end time.

13. A system for generating a traffic signal timing plan, the system comprising:

a traffic signal control system;

a server communication system; and a server controller in electrical communication with the traffic signal control system and the server communication system, wherein the server controller is programmed to:

receive telemetry data from one or more of a plurality of vehicles using the server communication system;

determine a current traffic metric based at least in part on the telemetry data;

identify a timing plan generation trigger, wherein to identify the timing plan generation trigger, the server controller is further programmed to:

identify a reactive timing plan generation trigger, wherein the reactive timing plan generation trigger is identified based at least in part on at least one of: a traffic anomaly, a time of day, a periodic trigger, and a random trigger;

receive a proactive timing plan generation trigger request, wherein the proactive timing plan generation trigger request includes event data about an event, and wherein the event is at least one of: a road management event, a weather event, and a public event; and identify a proactive timing plan generation trigger based on the event data;

determine at least one historic traffic metric, wherein to determine the at least one historic traffic metric, the server controller is further programmed to:

determine a plurality of long-term historic traffic metrics over a first time period; and determine a plurality of short-term historic traffic metrics over a second time period, wherein the second time period is shorter than the first time period;

generate at least one of: a reactive traffic signal timing plan and a proactive traffic signal timing plan based at least in part on at least one of: the current traffic metric, the timing plan generation trigger, and the at least one historic traffic metric in response to identifying the timing plan generation trigger;

adjust an operation of one or more traffic signals using the traffic signal control system based at least in part on at least one of: the reactive traffic signal timing plan and the proactive traffic signal timing plan; and wherein identifying the reactive timing plan generation trigger further comprises:

determining a short-term traffic metric change based at least in part on the current traffic metric and one or more of the plurality of short-term historic traffic metrics;

comparing the short-term traffic metric change to a predetermined short-term traffic metric change threshold; and identifying the reactive timing plan generation trigger in response to determining that the short-term traffic metric change is greater than or equal to the predetermined short-term traffic metric change threshold.

14. The system of claim 13, wherein to generate at least one of: the reactive traffic signal timing plan and the proactive traffic signal timing plan, the server controller is further programmed to:

determine a first predicted traffic metric change based at least in part on the current traffic metric and the at least one historic traffic metric;

generate the reactive traffic signal timing plan based at least in part on the first predicted traffic metric change, wherein the reactive traffic signal timing plan includes at least a reactive traffic signal timing plan validity;

determine a second predicted traffic metric change based at least in part on the current traffic metric, the at least one historic traffic metric, and event data; and generate the proactive traffic signal timing plan based at least in part on the second predicted traffic metric change, wherein the proactive traffic signal timing plan includes at least a proactive traffic signal timing plan validity, and wherein the proactive traffic signal timing plan validity is determined based at least in part on the event data.

* * * * *